United States Patent
Byrne et al.

(10) Patent No.: US 11,074,055 B2
(45) Date of Patent: Jul. 27, 2021

(54) IDENTIFICATION OF COMPONENTS USED IN SOFTWARE BINARIES THROUGH APPROXIMATE CONCRETE EXECUTION

(71) Applicant: International Business Machines Corporation, Armonk, NY (US)

(72) Inventors: Anthony C. Byrne, Weymouth, MA (US); Shripad Nadgowda, Elmsford, NY (US); Seetharami R. Seelam, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 130 days.

(21) Appl. No.: 16/441,386

(22) Filed: Jun. 14, 2019

(65) Prior Publication Data

US 2020/0394028 A1 Dec. 17, 2020

(51) Int. Cl.
  *G06F 9/45* (2006.01)
  *G06F 8/53* (2018.01)
  *G06F 9/455* (2018.01)
  *G06F 8/52* (2018.01)

(52) U.S. Cl.
  CPC .......... *G06F 8/53* (2013.01); *G06F 8/52* (2013.01); *G06F 9/45558* (2013.01); *G06F 2009/45562* (2013.01)

(58) Field of Classification Search
  CPC .................................................. G06F 8/52–53
  USPC ................................................. 717/136
  See application file for complete search history.

(56) References Cited

U.S. PATENT DOCUMENTS

| | | | | |
|---|---|---|---|---|
| 7,203,933 B2* | 4/2007 | Souloglou | ............... | G06F 8/44 717/138 |
| 7,380,242 B2* | 5/2008 | Alaluf | ............... | G06F 8/447 717/148 |
| 7,434,213 B1* | 10/2008 | Prakash | ............... | G06F 8/41 717/152 |
| 7,493,604 B2* | 2/2009 | Mariani | ............... | G06F 9/45516 717/106 |

(Continued)

OTHER PUBLICATIONS

Niranjan Hasabnis et al.; "Lifting Assembly to Intermediate Representation: A Novel Approach Leveraging Compilers"; ASPLOS '16, Apr. 2-6, 2016, Atlanta, GA, USA.*

(Continued)

*Primary Examiner* — Francisco J Aponte
(74) *Attorney, Agent, or Firm* — Amin, Turocy & Watson, LLP

(57) ABSTRACT

Systems, computer-implemented methods, and computer program products that facilitate identifying computer software vulnerabilities, and more specifically, execute an approximate representation of software to produce a fingerprint are provided. In one example, a system is provided. The system can comprise a memory that stores computer executable components and a processor that executes the computer executable components stored in the memory. The computer executable components can include a filter component and an execution component. The filter component can filter a platform-independent intermediate representation to a filtered representation. The execution component can execute the filtered representation on a virtual machine to produce an output vector which can be used to identify computer software vulnerabilities.

20 Claims, 10 Drawing Sheets

(56) References Cited

U.S. PATENT DOCUMENTS

| | | | | |
|---|---|---|---|---|
| 7,707,566 | B2* | 4/2010 | Grover | G06F 8/437 717/148 |
| 7,793,275 | B2* | 9/2010 | Bobrovsky | G06F 9/45516 717/148 |
| 7,840,951 | B1* | 11/2010 | Wright | G06F 9/45516 717/152 |
| 7,926,042 | B2 | 4/2011 | Mehta et al. | |
| 8,079,023 | B2* | 12/2011 | Chen | G06F 8/437 717/140 |
| 8,104,027 | B2* | 1/2012 | Owen | G06F 9/45516 717/146 |
| 8,312,439 | B2* | 11/2012 | Kielstra | G06F 9/45516 717/148 |
| 8,407,675 | B1* | 3/2013 | Clark | G06F 8/53 717/131 |
| 8,719,805 | B2* | 5/2014 | Zhao | G06F 8/427 717/143 |
| 8,793,670 | B2* | 7/2014 | Lagergren | G06F 8/41 717/148 |
| 8,990,789 | B2* | 3/2015 | Adl-Tabatabai | G06F 8/52 717/146 |
| 9,058,492 | B1 | 6/2015 | Satish | |
| 9,098,298 | B2* | 8/2015 | Ditu | G06F 8/41 |
| 9,152,400 | B2* | 10/2015 | de Lima Ottoni | G06F 8/52 |
| 9,274,925 | B2* | 3/2016 | Yoshida | G06F 11/3604 |
| 9,383,979 | B2* | 7/2016 | Adl-Tabatabai | G06F 8/52 |
| 9,411,664 | B1 | 8/2016 | Bradbury et al. | |
| 9,411,715 | B2* | 8/2016 | Susnea | G06F 12/023 |
| 9,424,013 | B2* | 8/2016 | Dice | G06F 8/4441 |
| 9,619,214 | B2* | 4/2017 | Gschwind | G06F 8/4443 |
| 9,880,821 | B2* | 1/2018 | Gschwind | G06F 8/4441 |
| 9,940,218 | B2* | 4/2018 | Moniz | G06F 8/53 |
| 10,031,734 | B2* | 7/2018 | Kim | H04L 67/1095 |
| 10,268,497 | B2* | 4/2019 | Rong | G06F 9/45508 |
| 10,338,902 | B1* | 7/2019 | Sevigny | G06F 8/433 |
| 10,372,431 | B2* | 8/2019 | Munshi | G06F 8/456 |
| 10,514,909 | B2* | 12/2019 | Yahav | G06F 8/75 |
| 10,705,814 | B2* | 7/2020 | Schulte | G06F 8/53 |
| 10,706,746 | B2* | 7/2020 | Gounares | H04L 9/002 |
| 10,782,945 | B1* | 9/2020 | Craik | G06F 8/4434 |
| 2004/0128660 | A1* | 7/2004 | Nair | G06F 8/433 717/156 |
| 2006/0129972 | A1* | 6/2006 | Tyburski | G06F 8/70 717/106 |
| 2006/0158354 | A1* | 7/2006 | Aberg | G06F 8/447 341/50 |
| 2010/0083238 | A1 | 4/2010 | Barnett et al. | |
| 2010/0299661 | A1* | 11/2010 | Citron | G06F 8/443 717/154 |
| 2013/0031536 | A1* | 1/2013 | De | G06F 9/4552 717/146 |
| 2015/0074655 | A1* | 3/2015 | de Lima Ottoni | G06F 8/52 717/154 |
| 2015/0294114 | A1* | 10/2015 | Monahan | G06F 21/14 726/26 |
| 2015/0363294 | A1* | 12/2015 | Carback, III | G06F 8/37 717/132 |
| 2016/0274879 | A1* | 9/2016 | Rioux | G06F 8/427 |
| 2017/0046142 | A1* | 2/2017 | Desineni | G06F 8/54 |
| 2018/0189042 | A1* | 7/2018 | Noonan | G06F 8/437 |
| 2018/0285101 | A1* | 10/2018 | Yahav | G06F 8/75 |
| 2019/0095566 | A1* | 3/2019 | Denisenko | G06F 30/327 |
| 2020/0334544 | A1* | 10/2020 | Liu | G06N 3/105 |

OTHER PUBLICATIONS

Jakub Kroustek et al.; "Reconstruction of Instruction Idioms in a Retargetable Decompiler"; Proceedings of the 2013 Federated Conference on Computer Science and Information Systems pp. 1519-1526; 2013, IEEE.*

Gheorghescu, "An Automated Virus Classification System," Virus Bulletin Conference Oct. 2005 © 2005 Virus Bulletin Ltd., 7 pages.

Tian, et al., "An Automated Classification System Based on the Strings of Trojan and Virus Families," (c) 2009 IEEE, 2009 4th International Conference on Malicious and Unwanted Software (MALWARE), 8 pages.

Binaryanalysis.org, "Binary Analysis Tool," Retrieved: Apr. 30, 2019, 1 page.

Conti, et al., "Visual Reverse Engineering of Binary and Data Files," Last Accessed: May 6, 2019, 18 pages.

Pewny, et al., "Cross-Architecture Bug Search in Binary Executables," Last Accessed: May 6, 2019, 16 pages.

blog.docker.com, "Docker Security Scanning safeguards the container content lifecycle," Last Accessed: May 6, 2019, 1 page.

docs.docker.com, "Docker Security Scanning," Last Accessed: May 6, 2019, 7 pages.

Dullien, et al., "REIL: A platform-independent intermediate representation of disassembled code for static code analysis," CanSecWest 2009 Vancouver, Canada, Copyright 2009 zynamics GmbH, 7 pages.

Andriesse, et al., "Compiler-Agnostic Function Detection in Binaries," 2017 IEEE European Symposium on Security and Privacy, © 2017, Dennis Andriesse. Under license to IEEE, DOI 10.1109/EuroSP.2017.11, 13 pages.

Fujimoto, et al., "Direct Execution Models of Processor Behavior and Performance," Proceedings of the 1987 Winter Simulation Conference, 8 pages.

hex-rays.com, "IDA F.L.I.R.T. Technology: In-Depth," Last Accessed: May 7, 2019, 6 pages.

Ogawa, "Compile-time Optimization and Customization in Java and C + MPI," Mar. 2009, 184 pages.

Pendawn, et al., "Binary Analysis Tool," Version 4, Last Accessed: May 7, 2019, 7 pages.

* cited by examiner

IDENTIFICATION OF COMPONENTS USED IN SOFTWARE BINARIES THROUGH APPROXIMATE CONCRETE EXECUTION

BACKGROUND

The subject disclosure relates to identifying components used in software binaries, and more specifically, to execution of an approximate representation of software to produce a fingerprint.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments, devices, systems, computer-implemented methods and/or computer program products that facilitate identification of computer software vulnerabilities, and more specifically, execution of an approximate representation of software to produce a fingerprint, are described.

According to an embodiment, a system is provided. The system can comprise a memory that stores computer executable components and a processor that executes the computer executable components stored in the memory. The computer executable components can include a filter component and an execution component. The filter component can filter a platform-independent intermediate representation to a filtered representation. The execution component can execute the filtered representation on a virtual machine to produce an output vector.

According to another embodiment, a computer-implemented method is provided. The computer-implemented method can comprise filtering, by a system operatively coupled to a processor, a platform-independent intermediate representation to a filtered representation. The computer-implemented method can also comprise executing the filtered representation on a virtual machine to produce an output vector.

According to yet another embodiment, a computer program product for identifying code vulnerabilities can comprise a computer readable storage medium having program instructions embodied therewith. The program instructions can be executable by a processor and cause the processor filter, by the processor, a platform-independent intermediate representation to a filtered representation. The program instructions can also cause the processor to execute, by the processor, the filtered representation on a virtual machine to produce an output vector.

DETAILED DESCRIPTION

Figure 1:
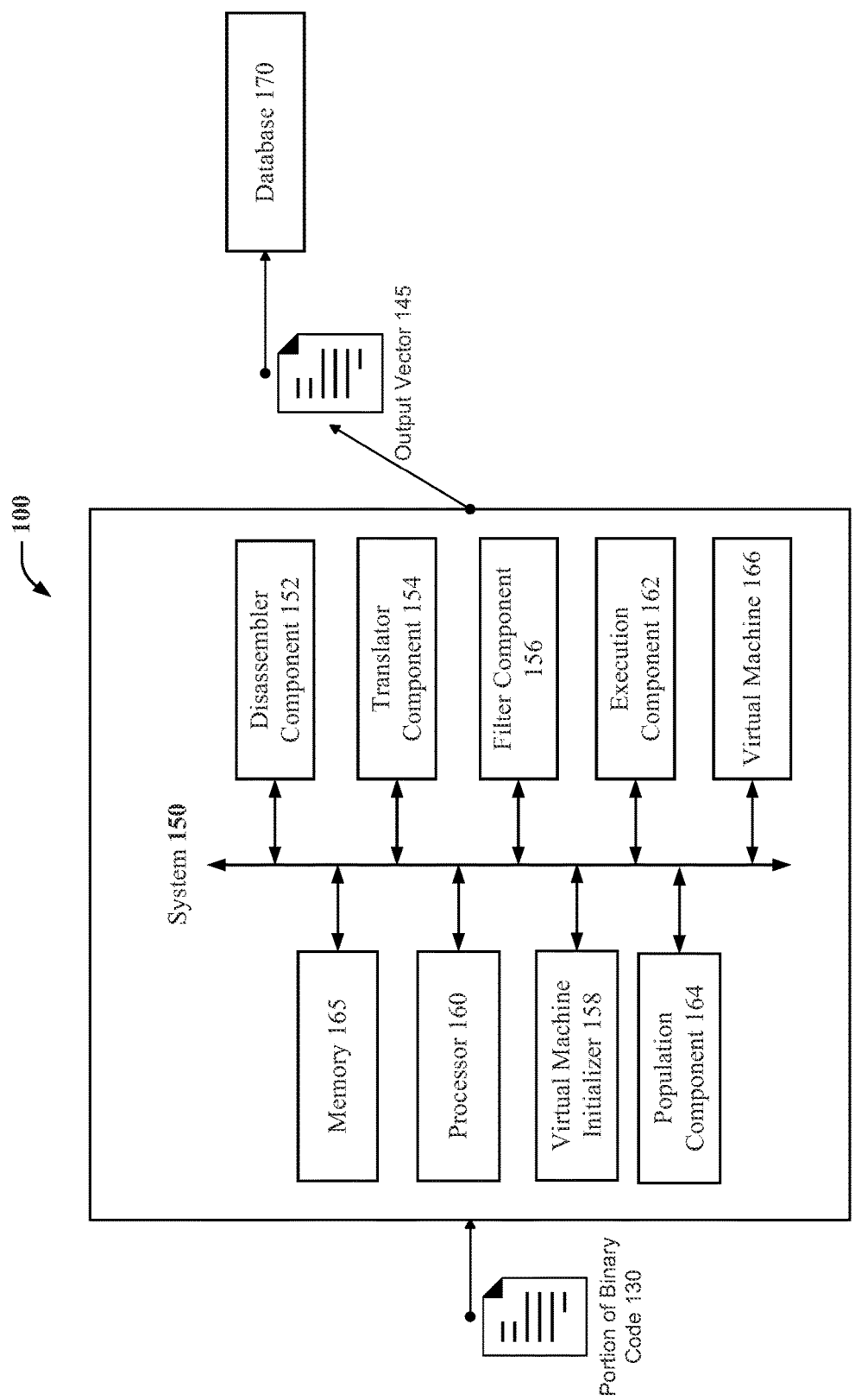
FIG. 1 illustrates a block diagram of an example, non-limiting system that can generate a function fingerprint from a portion of binary code in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

With the increase in the use of third-party components (e.g., libraries and container images), which are frequently downloaded from public repositories with few security checks, to produce stripped, statically-linked binaries, there are many files with outdated dependencies and vulnerabilities that can be difficult to detect. This has led to multiple security breaches, wherein third-party components compiled with other binaries contained components contained arbitrary code execution and/or buffer over-read vulnerabilities.

Embodiments described herein include systems, computer-implemented methods, apparatus and computer program products for identifying code vulnerabilities by producing at least one function fingerprint. For example, in one embodiment, a memory that stores computer executable components and a processor that executes the computer executable components stored in the memory can be employed to filter a platform-independent intermediate representation to a filtered representation and execute the filtered representation on a virtual machine to create an output vector. The output vector can be the register values and memory values of the virtual machine. In a non-limiting example, a disassembler can be employed to disassemble a portion of binary code to disassembled code, wherein the portion of binary code is a function from one or more stripped binaries comprising one or more bounds provided by a function identifier. In a non-limiting example, a translator can translate the disassembled code to the platform-independent intermediate representation, wherein the platform-independent intermediate representation is a meta-assembly language. As used herein, a meta-assembly language can be a platform-independent representation that is higher level than assembly, but lower level than source code, and is intended to represent code symbolically and run directly on a virtual machine. A population component can be employed to populate a database with the output vector. Further, the filter can remove one or more complex instructions from the platform-independent intermediate representation and can sort the platform-independent intermediate representation to make the platform-independent intermediate representation compiler independent. The complex instructions can include instructions related to control flow, addressing modes, or floating-point operations of the platform-independent intermediate representation. The filter can sort the platform independent intermediate representation to account for differences in compilers that produced the portion of binary code. A virtual machine initializer can be included that initializes the virtual machine with a pattern of register values and memory values. As such, a fingerprint of binary functions is produced that neither requires the production of input and output pairs, nor is dependent upon a particular machine architecture or compiler.

The system and/or the components of the system can be employed to use hardware and/or software to solve problems that are highly technical in nature (e.g., related to disassembly, translation, filtering, execution), that are not abstract and that cannot be performed as a set of mental acts by a human because they refer to specific machine processes. For example, a human cannot disassemble a portion of binary code on a computer-readable medium, as a human cannot read a computer readable medium, or translate this portion once disassembled on a computer-readable medium to a platform-independent intermediate representation. Further, some of the processes, such as execution of a filtered representation on a virtual machine to obtain an output vector, can be performed by specialized computers for carrying out defined tasks related to the vulnerability identifying subject area. The system and/or components of the system can be employed to solve new problems that arise through advancements in technology, computer networks, the Internet and the like. The system can provide technical improvements to identifying vulnerabilities by improving processing efficiency relative to symbolic execution, and providing a consistent way of fingerprinting functions, particularly those that can be in statically-linked and/or stripped binaries. In this way, the system can reduce delay in processing performed by processing components in a vulnerability identification system, and/or avoid or reduce the likelihood of false identification of vulnerabilities in a system, etc.

FIG. 1 illustrates a block diagram 100 of an example, non-limiting system 150 that can identify code vulnerabilities in a portion of binary code 130 by producing an output vector 145 based on execution on a virtual machine 166 in accordance with one or more embodiments described herein.

According to multiple embodiments, memory 165 can store one or more computer and/or machine readable, writable, and/or executable components and/or instructions that, when coupled with a processor 160, can facilitate performance of operations defined by the executable components and/or instructions. For example, memory 165 can store computer and/or machine readable, writable, and/or executable components and/or instructions that, when executed by a processor 160, can facilitate execution of the various functions described herein relating to the system 150, including disassembler component 152, translator component 154, filter component 156, virtual machine initializer 158, execution component 162, population component 164, and virtual machine 166. As described with FIGS. 2-10 below, system 150 can identify code vulnerabilities in a portion of binary code 130 by producing an output vector 145 based on execution on a virtual machine 166 that can be stored in a database 170.

In one or more embodiments, portion of binary code 130 can be a function provided by a function identifier. The function identifier can divide the portion of binary code 130 into individual, labeled functions using metadata provided with the portion of binary code 130 and/or data provided by an operator. The portion of binary code 130 can come from one or more stripped binaries. A stripped binary can be a binary in which metadata has been removed, which can make individual functions within a binary more difficult to identify. The portion of binary code 130 can be statically linked, wherein statically linked can mean at least some of an application's dependencies (i.e. libraries) can be "baked into" the final binary, which can remove library metadata. The function identifier can determine function bounds, for example, by isolating basic blocks of binary code, eliminating function calls between nodes, and following the control flow (ignoring direction) between the basic blocks. In this way, the function identifier can determine function bounds even if a binary is stripped and/or statically linked.

The disassembler component 152 can convert the portion of binary code 130 into assembly language. A portion of binary code 130 can be received by the disassembler component 152 and converted into an equivalent, higher-level (relative to binary) language, such as assembly language.

The disassembler component 152 can be, without limitation, an x86, x86_64, Advanced Reduced Instruction Set Computing (RISC) Machine (ARM), ARMv7, PPC64, or PPC64LE (PPC64 little-endian) disassembler component 152. The disassembler component 152 can be, without limitation, a linear sweeper or a recursive sweeper disassembler component 152. A linear sweeper reads consecutive N-bytes of binary until a string of bytes corresponding to an assembly opcode is obtained, outputs the opcode, and proceeds to read the next consecutive N-bytes. A recursive sweeper reads the first N-bytes, outputting opcodes corresponding to the bytes in consecutive fashion like a linear sweeper, until a jump is read, and then the recursive sweeper will follow the jump and proceed to output opcodes from the new point. A linear sweeper and recursive sweeper will output substantively equivalent, though different in appearance and order, outputs.

The translator component 154 can translate the assembly language code into a platform-independent intermediate representation. A platform-independent intermediate representation is an architecture-independent program representation that is higher level than assembly or binary, but lower and more machine-level than a source programming language like C++. By translating to a platform-independent intermediate representation, architecture dependencies in the assembly code or differences in the type of disassembler used (e.g., linear sweeper vs. recursive sweeper) can be removed. The platform-independent intermediate representation can be, by way of example, a meta-assembly language.

The filter component 156 can filter the platform-independent intermediate representation into a filtered representation. The filter component 156 can remove one or more complex instructions. The complex instructions can include instructions related to control flow, addressing mode, and/or floating point operations of the platform independent intermediate representation. The filter component 156 can sort the instructions deterministically, to eliminate differences that result from the compiler that produced the original portion of binary code 130, thereby making the filtered representation compiler independent.

The virtual machine initializer 158 can initialize a virtual machine 166. The virtual machine initializer 158 can pre-populate the virtual machine 166 with a pre-determined, consistent set of register values and memory values.

The execution component 162 executes the filtered representation on the virtual machine 166. Based on approximate concrete execution, the virtual machine 166 will have register values and/or memory values that can be the values of an output vector 145. This execution, wherein the filtered representation is executed on a virtual machine concretely, but with loose adherence to the intended effect of the initial portion of binary code 130, can be called approximate concrete execution. Approximate concrete execution can include execution of individual instructions with loose adherence to the intended effect of the instructions. Approximate concrete execution can include execution of an approximate but more efficient instruction set.

The population component 164 can populate a database 170 with the output vector 145. The output vector 145 can be labeled. The label can include a function name, library name, and/or library version. In the database 170, the output vector 145 can serve as a vulnerability fingerprint of the portion of binary code 130. An entity or machine learning model can search for the fingerprint based on, for example, cosine similarity with another fingerprint or set of fingerprints. As used herein, an entity can be a human, user, machine, device, computer or the like. Further, an entity or machine learning model can utilize the fingerprint(s) to recognize and/or classify pieces of code. An entity or machine learning model can classify code by cosine similarity of the output vector 145 to others, or by, for example, similar individual vector components.

Figure 2:
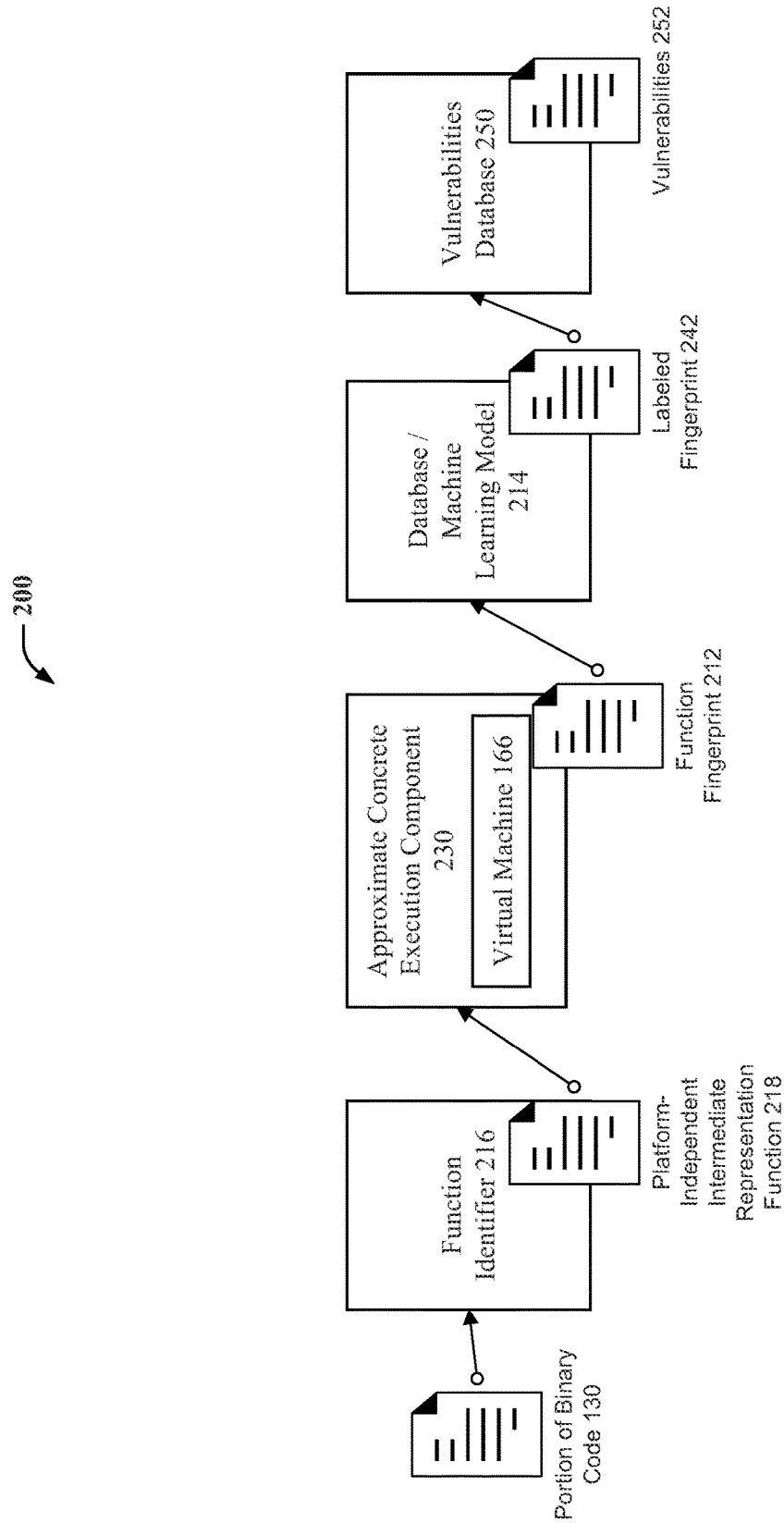
FIG. 2 illustrates a block diagram of an example, non-limiting system that can identify names and versions of a portion of binary code in accordance with one or more embodiments described herein.

FIG. 2 illustrates another diagram of an example, non-limiting system 200 that can identify code vulnerabilities in a portion of binary code 130 by comparing a function fingerprint 212 to others in a database and/or machine learning model 214 in accordance with one or more embodiments described herein. Repetitive description of like elements employed in other embodiments described herein is omitted for sake of brevity.

According to multiple embodiments, an entity or algorithm submits a portion of binary code 130 for evaluation by the system 200. The algorithm can be a computer program that detects possible vulnerabilities in a multi-node or cloud environment. The system 200 passes the portion of binary code to a function identifier 216. The function identifier 216 determines function bounds within the portion of binary code 130, utilizes a disassembler component 152 to produce disassembled code, and translates the disassembled code to produce a platform-independent intermediate representation function 218. The system 200 passes the platform-independent intermediate representation function 218 to an approximate concrete execution component 230. The approximate concrete execution component 230 can execute a filtered representation based on the platform-independent intermediate representation function 218 by approximate concrete execution on a virtual machine 166 to produce a function fingerprint 212, which can be a numerical vector of register values and memory values from the virtual machine 166. The approximate concrete execution component can include a filter component 156 to produce the filtered representation. The function fingerprint 212 can be translated to a hash. The system 200 can pass the function fingerprint 212 to a database and/or machine learning model 214. The database and/or machine learning model 214 can store the function fingerprint 212, compare the function fingerprint 212 against others in the database and/or machine learning model 214, and/or the classify the function fingerprint 212, including using AI. The function fingerprint 212 can be labeled with a function name, library name, and/or library version. The system 200 can pass the function fingerprint 212 with a label 242 to at least one vulnerabilities database 250, wherein identified libraries and functions can be searched for vulnerabilities 252.

The portion of binary code 130 can be, without limitation, full application executables or library-specific shared object files. Sources of the files can be package repositories, public vulnerability databases, and/or source code repositories. The portion of binary code 130 can be provided by an entity or autonomously. An autonomous provider of the portion of binary code can include a computer program that detects possible vulnerabilities in a multi-node or cloud environment The function identifier 216 can receive the portion of binary code 130 and divide it into individual, labeled functions. For example, the function identifier 216 can divide the portion of binary code 130 into individual, labeled functions using metadata provided with the portion of binary code 130 and/or data provided by an operator. The function identifier 216 can determine function bounds. The function identifier 216 can utilize a disassembler component 152 to disassemble the portion of binary code 130 into a higher-level (than binary) representation, for example, assembly code. The function identifier 216 can utilize a translator component 154 to translate the assembly code into a platform-independent intermediate representation and produce a platform-independent intermediate representation function 218.

The approximate concrete execution component 230 can execute a filtered representation based on the platform-independent intermediate representation function 218 on a virtual machine 166 by approximate concrete execution. Approximate concrete execution is execution wherein a filtered representation is executed with loose adherence to the intended effect of the initial portion of binary code 130. The virtual machine 166 can be pre-populated with register values and memory values. The register values and memory values can be constant for the initial state of the virtual machine across multiple executions of multiple functions. A filter component 156 can produce a filtered representation by removing at least one complex instruction from the platform-independent intermediate representation function 218 and/or sorting the platform-independent intermediate representation function 218, which can be based on the removal of the at least one complex instruction. Based on execution in the virtual machine 166, the approximate concrete execution component 230 produces a function fingerprint 212. The function fingerprint 212 can be a vector of register and/or memory values of the virtual machine 166 based on execution of the filtered representation of the platform-independent intermediate representation function 218, and can be labeled with a function name, library name, and/or library version.

The database or machine learning model 214 can receive the function fingerprint 212, which can comprise or consist of the output vector 145. The database or machine learning model 214 can store, compare, and/or classify the function fingerprint 212. The at least one vulnerabilities database 250 can receive the function fingerprint 212, which can include a label 242. The vulnerabilities database 250 can be searched for vulnerabilities 252. Vulnerabilities 252 can be detected by, for example, cosine similarity of a function fingerprint 212 to another with known vulnerabilities 252.

Figure 3:
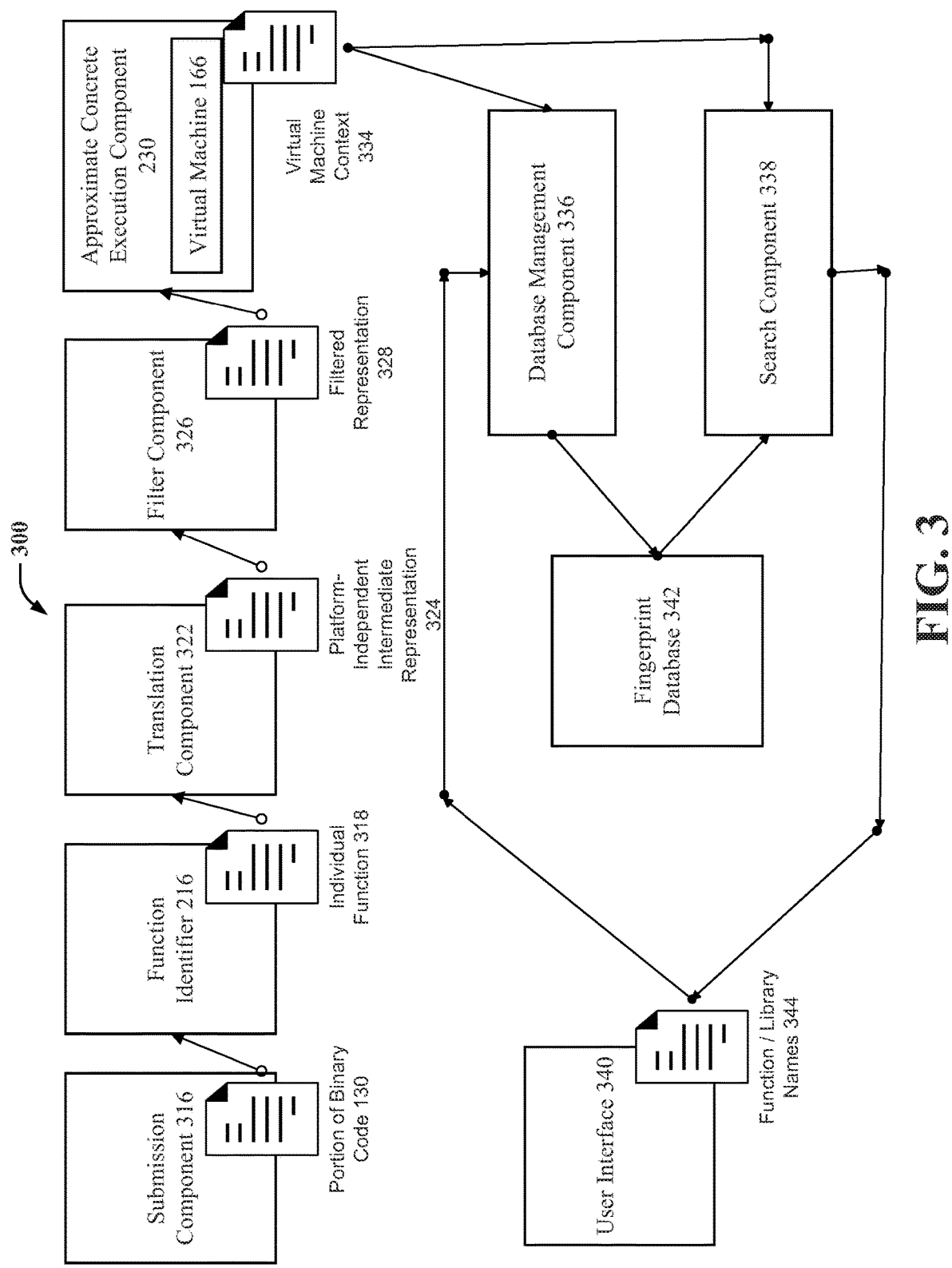
FIG. 3 illustrates a block diagram of an example, non-limiting system that can build and/or use a database of machine code fingerprints in a portion of binary code in accordance with one or more embodiments described herein.

FIG. 3 illustrates another diagram of an example, non-limiting system 300 that can identify vulnerabilities in a portion of binary code 130 by comparing a function fingerprint 212 to others in a database in accordance with one or more embodiments described herein. Repetitive description of like elements employed in other embodiments described herein is omitted for sake of brevity.

According to multiple embodiments, a submission component 316 identifies a portion of binary code 130. The submission component 316 or an entity passes the portion of binary code 130 to a function identifier 216. The function identifier 216 can identify function bounds within binaries that are statically linked, stripped, neither statically linked nor stripped, or both statically-linked and stripped. The function identifier 216 can identify and/or isolate a portion of binary code 130 wherein the portion of binary code 130 is a function from one or more stripped binaries comprising one or more bounds. The function identifier 216 can utilize a disassembler component 152 to produce an assembly-language representation of the portion of binary code 130 to produce at least one individual function 318. A translation component 322 translates the individual function 318 into a platform-independent intermediate representation 324. The platform-independent intermediate representation 324 is in a higher level language than assembly, but lower level than typical source code, such as C or C++, and is architecture independent. The platform-independent intermediate representation 324 can be in, without limitation, a meta-assembly language. The translation component 322 passes the platform-independent intermediate representation 324 to at least one filter component 326. The filter component 326 can produce a filtered representation 328 by removing at least one complex instruction from the platform-independent intermediate representation 324 and/or sorting the platform-independent intermediate representation 324, which can be based on the removal of the at least one complex instruction. The filter component 326 passes the filtered representation 328 to an approximate concrete execution component 230. The approximate concrete execution component 230 can include a virtual machine 166 that is pre-populated with a consistent set of initial register values and memory values. The approximate concrete execution component 230 can loosely execute the filtered representation 328 on the virtual machine to produce a virtual machine context 334. The virtual machine context 334 can include the final register values and memory values of the virtual machine 166, which can comprise or consist of an output vector 145. The approximate concrete execution component 230 can pass the virtual machine context 334 to a database management component 336 or a search component 338. The database management component 336 can receive the virtual machine context 334 and associated function/library names from a user interface 340 and populate a fingerprint database 342 with a combined virtual machine context 334 and function/library name 344. The search component 338 can receive a virtual machine context 334 and search the fingerprint database for cosine-similar vectors of register values and memory values. The search component 338 can pass the most cosine-similar vector(s) associated function/library names 344 to a user interface 340.

The submission component 316 can be a component utilizing an algorithm for identifying suspicious code, a code package repository, public vulnerability database, source code repository, or a user interface that can receive binary code from an entity. The portion of binary code 130 can be a full application executable, library-specific shared object file(s), or other sequence of binary encoded instructions.

The function identifier 216 can receive the portion of binary code 130 determine the function bounds, and output at least one individual function 318. The at least one individual function 318 can be in assembly language, as the function identifier 216 can utilize a disassembler component 152 to provide a higher-level (than binary) representation. The function identifier 216 can utilize metadata from the portion of binary code 130. The function identifier 216 can determine function bounds in a stripped binary by isolating basic blocks of binary code, eliminating function calls between nodes, and following the control flow (ignoring direction) between the basic blocks, thereby determining the basic blocks that compose an individual function.

The translation component 322 can receive the disassembled portion of binary code 130, which is disassembled code, and translate it to a platform-independent intermediate representation 324. The platform-independent intermediate representation can be, without limitation, a meta-assembly language.

The filter component 326 can receive the platform-independent intermediate representation 324 and remove one or more complex instructions, deterministically sort the instructions with only loose adherence to the intended effect of the function and produce a filtered representation 328. The complex instructions can be instruction related to control flow, addressing modes, and/or floating point operations of the platform-independent intermediate representation 324. The sorting of the remaining instructions can produce a filtered representation 328 that is compiler independent.

The approximate concrete execution component 230 can receive the filtered representation 328. The approximate concrete execution component 230 can initialize a virtual machine 166 with pre-determined, consistent initial register values and memory values and loosely execute the filtered representation 328 on the virtual machine 166. The approximate concrete execution component 230 can execute the filtered representation 328 on the virtual machine 166 by approximate concrete execution. Approximate concrete execution is execution wherein a filtered representation is executed on a virtual machine concretely, but with loose adherence to the intended effect of the initial portion of binary code 130. Approximate concrete execution can include execution of individual instructions with loose adherence to the intended effect of the instructions. Approximate concrete execution can include execution of an approximate but more efficient instruction set. The final register values and memory values of the virtual machine 166 based on approximate concrete execution of the filtered representation 328 can be a virtual machine context 334, which can be translated to a hash. The approximate concrete execution component 230 can pass the virtual machine context 334 to a database management component 336 and/or a search component 338.

The user interface 340 can submit a function/library name or function/library names 344 to a search component 338, which can search a database 342 for vulnerabilities associated with the function/library names 344. The user interface 340 can submit function/library names 344 to a database management component 336, which can associate function/library names 344 with a portion of binary code 130 based on submission from the submission component 316.

Figure 4:
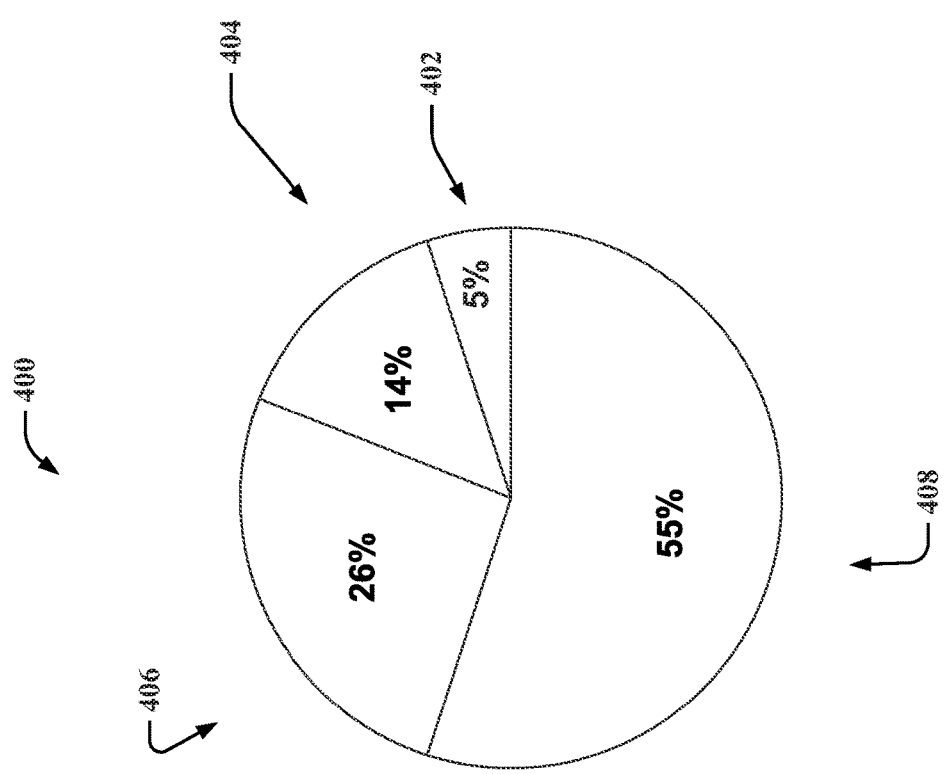
FIG. 4 illustrates a pie chart showing the increased speed and efficiency provided by the disclosed systems, computer-implemented methods, and computer program products over symbolic execution in accordance with one or more embodiments described herein.

FIG. 4 illustrates a pie chart 400 showing the increased speed and efficiency provided by the disclosed systems, computer-implemented methods, and computer program products over symbolic execution. Repetitive description of like elements employed in other embodiments described herein is omitted for sake of brevity.

Symbolic execution is a method wherein a binary is disassembled to a disassembled binary, the disassembled binary is translated into an intermediate representation, symbolic expressions are extracted from the intermediate representation, then many (usually on the order of hundreds) of sets of random inputs are concretely executed individually to generate sets of I/O pairs, and the sets of I/O pairs are then sampled to generate a locally-sensitive hash. Symbolic execution can be considered a method of developing a fingerprint based on concrete sampling of many I/O pairs.

In contrast to the present embodiments, for symbolic execution, disassembly 402 represents approximately 5% of the processor runtime required for the process of generating a hash. Translation 404 of the disassembled binary to an intermediate representation represents about 14% of the processor runtime required for the process of generating a hash. Extraction 406 of symbolic expressions represents about 26% of the processor runtime required for the process of generating a hash. Execution 408 of the symbolic expressions with enough I/O pairs to generate a hash represents about 55% of the processor runtime required for the process of generating a hash.

The present embodiments utilize processor runtime similarly for only the disassembly 402 and translation 404 steps. Approximate concrete execution does not require extraction 406 of symbolic expressions or multiple executions. This represents an increase in processor runtime of about 55% (for execution 408) and 26% (for extraction 406), or about 81% total. Further, unlike the hashes generated by symbolic execution, the fingerprints of approximate concrete execution are not locally-sensitive, as they can be or be based on the final register values and memory values of a virtual machine with pre-determined, consistent initial register values and memory values.

Figure 5:
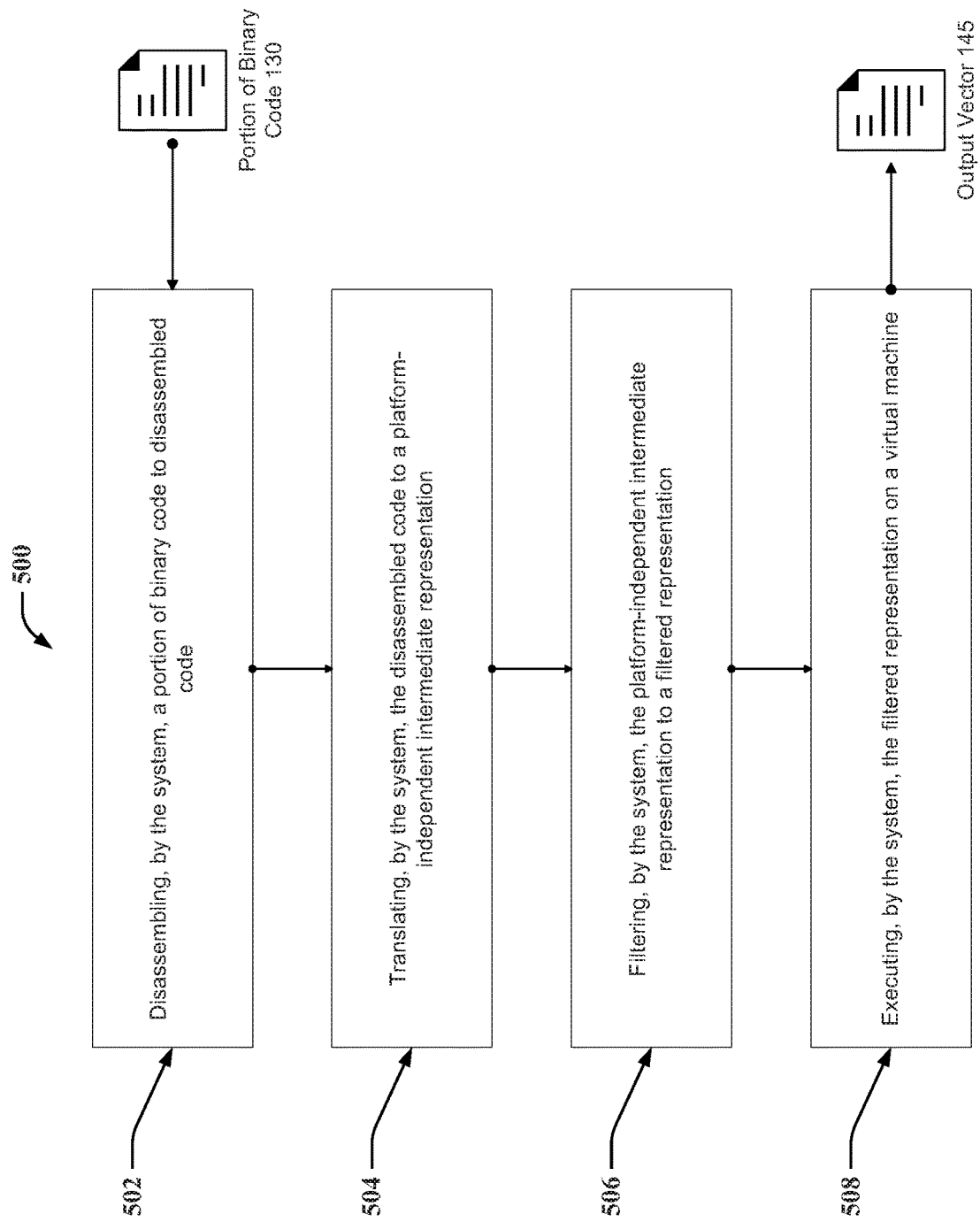
FIG. 5 illustrates a flow diagram of an example, non-limiting computer-implemented method that can generate a function fingerprint from a portion of binary code in accordance with one or more embodiments described herein.

FIG. 5 illustrates a flow diagram 500 of an example, non-limiting computer-implemented method that can generate a function fingerprint from a portion of binary code 130 in accordance with one or more embodiments described herein. Repetitive description of like elements employed in other embodiments described herein is omitted for sake of brevity.

At 502, a portion of binary code 130 is disassembled into assembly language (e.g., via the disassembler component 152). Disassembling, by the system, a portion of binary code to disassembled code 502 can be performed with a disassembler component 152. In one or more embodiments, portion of binary code 130 can be a function provided by a function identifier 216. The portion of binary code 130 can come from one or more stripped binaries. The disassembler component 152 can convert the portion of binary code 130 into assembly language. The disassembler component 152 can be, without limitation, an x86, x86_64, ARM, ARMv7, PPC64, or PPC64LE disassembler. The disassembler component 152 can be, without limitation, a linear sweeper or recursive sweeper.

At 504, the disassembled binary is translated into a platform-independent intermediate representation (e.g., via the translator component 154). Translating, by the system, the disassembled code to a platform-independent intermediate representation 504 can include translating an assembly-language representation of a function in the portion of binary code 130 to an architecture-independent language higher than assembly, but lower than a source code level language. The platform-independent intermediate representation can be, by way of example, a meta-assembly language.

At 506, the platform independent intermediate representation is filtered to a filtered representation (e.g., via the filter component 156). Filtering can be by a system operatively coupled to a processor. Filtering, by the system, a platform-independent intermediate representation to a filtered representation 506 can remove one or more complex instructions. The complex instructions can include instructions related to control flow, addressing modes, and/or floating point operations of the platform independent intermediate representation. The filtering can include sorting the remaining instructions deterministically, to eliminate differences that result from the compiler that produced the original portion of binary code 130, thereby making the filtered representation compiler independent.

At 508, the filtered representation is executed on a virtual machine (e.g., via the execution component 162). Executing, by the system, the filtered representation on a virtual machine 508 can include a virtual machine initializer 158 can initialize a virtual machine 166. Executing, by the system, the filtered representation on a virtual machine 508 can include a virtual machine initializer 158 pre-populating a virtual machine 166 with a pre-determined, consistent set of register values and memory values. Executing, by the system, the filtered representation on a virtual machine 508 can be approximate concrete execution. This approximate concrete execution, wherein the filtered representation is executed on a virtual machine concretely, but with loose adherence to the intended effect of the initial portion of binary code 130, can be called approximate concrete execution. Concrete execution of the filtered representation can be direct execution of the filtered representation with concrete inputs. Approximate concrete execution can include execution of individual instructions with loose adherence to the intended effect of the instructions. An example of loose adherence can be execution of a function intended to add two integers to produce a third integer that is the sum of the other two can be loosely executed as a function that accepts two integers and produces a third, but wherein the third is not necessarily the mathematical sum of the first two. Approximate concrete execution can include execution of an approximate but more efficient instruction set, for example, an instruction set with loose adherence to the intended effect of the original binary, but with fewer instructions. Based on the executing the filtered representation on a virtual machine 508, the virtual machine 166 will have register values and/or memory values that can be the values of an output vector 145. A register value can be a numerical value stored on a register of the virtual machine 166 central processing unit. Registers typically comprise small amounts of storage relative to memory but are faster than memory. Memory values can be numerical values stored on memory addresses of the virtual machine 166. Memory typically comprises numerical values representing instructions and data the machine is presently executing or manipulating.

Populating a database with the output vector 145 can occur by a population component 164. The output vector 145 can be labeled with a library and/or function name, translated to a hash, or both labeled and translated to a hash, wherein the output vector 145 serves as input to a function that translates the output vector 145 to a different value. In the database, the output vector serves as a vulnerability fingerprint of the portion of binary code 130. An entity or machine learning model can search for the fingerprint based on, for example, cosine similarity with another fingerprint or set of fingerprints. Further, an entity or machine learning model can utilize one or more fingerprints to recognize and/or classify pieces of code.

Figure 6:
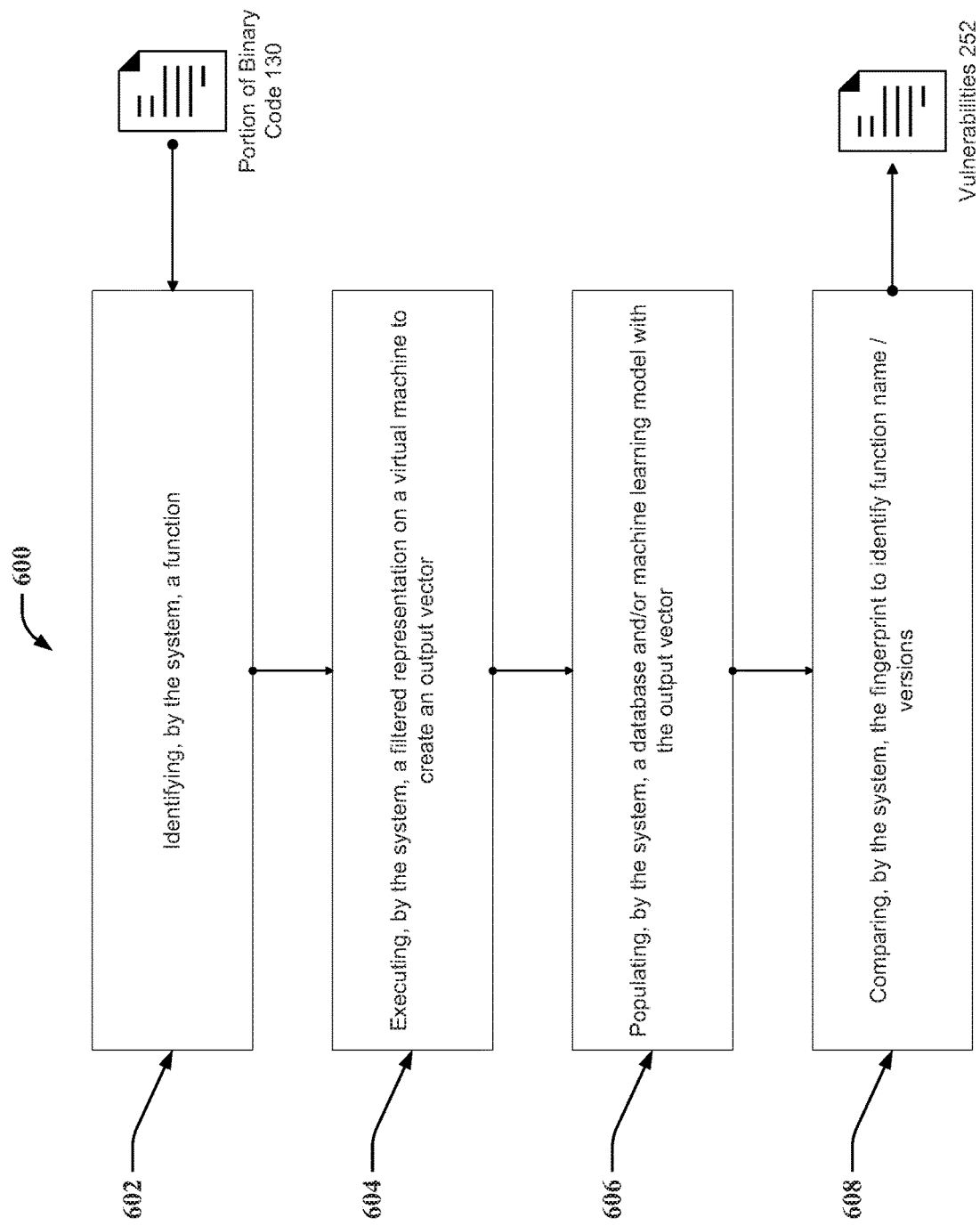
FIG. 6 illustrates a flow diagram of an example, non-limiting computer-implemented method that can identify names and versions of a portion of binary code in accordance with one or more embodiments described herein.

FIG. 6 illustrates a flow diagram 600 of an example, non-limiting computer-implemented method that can identify names and versions of a portion of binary code 130 in accordance with one or more embodiments described herein. Repetitive description of like elements employed in other embodiments described herein is omitted for sake of brevity.

At 602, a function is identified from a portion of binary code 130. Identifying, by the system, a function, can include, according to multiple embodiments, an entity or algorithm submitting a portion of binary code 130 for evaluation by the system 150, 200, 300. The algorithm can be a computer program that detects possible vulnerabilities in a multi-node or cloud environment. The system 200 passes the portion of binary code to a function identifier 216. Identifying, by the system, a function 602 can utilize the function identifier 216, wherein the function identifier 216 can determine function bounds, for example, by isolating basic blocks of binary code, eliminating function calls between nodes, and following the control flow (ignoring direction) between the basic blocks. In this way, the function identifier 216 can determine function bounds even if a binary is stripped and/or statically linked. The function identifier can also utilize entity-provided data or metadata within the portion of binary code 130, if available. The function identifier 216 determines function bounds within the portion of binary code 130 to produce a platform-independent intermediate representation function 218 upon disassembly of the portion of binary code 130 with a disassembler component 152 within the function bounds. The portion of binary code 130 can be, without limitation, full application executables or library-specific shared object files. Sources of the files can be package repositories, public vulnerability databases, and/or source code repositories.

The function identifier 216 can receive the portion of binary code 130 and divide it into individual functions. The individual functions can be labeled. For example, the function identifier 216 can divide the portion of binary code 130 into individual, labeled functions using metadata provided with the portion of binary code 130 and/or data provided by an operator. The function identifier 216 can utilize a disassembler component 152 to disassemble the portion of binary code 130 into a higher-level (than binary) representation, for example, assembly code. The function identifier 216 can utilize a translator to translate the assembly code into a platform-independent intermediate representation and produce a platform-independent intermediate representation function 218. The system 200 passes the platform-independent intermediate representation function 218 as a filtered representation 328, wherein the filtered representation 328 is based on output of a filter component 156, to an approximate concrete execution component 230.

At 604, the function is executed by approximate concrete execution by an approximate concrete execution component 230. Executing, by the system, the filtered representation virtual machine to create an output vector 604 can include an approximate concrete execution component 230 loosely executing a filtered representation 328 on a virtual machine 166 to produce a function fingerprint 212, which can be a numerical vector of register values and memory values from the virtual machine 166 based on the approximate execution. The function fingerprint 212, which can comprise or consist of an output vector 145, can be translated to a hash.

The approximate concrete execution component 230 can execute the platform-independent intermediate representation function 218 on a virtual machine 166 by approximate concrete execution. Approximate concrete execution is execution wherein a filtered representation 328 is executed with loose adherence to the intended effect of the initial portion of binary code 130. The virtual machine 166 can be pre-populated with register values and memory values. The register values and memory values can be constant for the initial state of the virtual machine across multiple executions of multiple functions. A filter component 156 can produce a filtered representation by removing at least one complex instruction from the platform-independent intermediate representation function 218 and/or sorting the platform-independent intermediate representation function 218, which can be based on the removal of the at least one complex instruction. Based on execution of the filtered representation 328 in the virtual machine 166, the approximate concrete execution component 230 produces a function fingerprint 212. The function fingerprint 212 can be a vector of register and/or memory values of the virtual machine 166 based on execution of the filtered representation of the platform-independent intermediate representation function 218, and can be labeled with a function name, library name, and/or library version.

At 606, the system can populate a database and/or machine learning model 214 with the function fingerprint 212. Populating, by the system, a database with the output vector 606 can include storing the function fingerprint 212 in the database and/or machine learning model 214, comparing the function fingerprint 212 against others in the database and/or machine learning model 214, and/or the classifying the function fingerprint 212, including using AI. The function fingerprint 212 can be labeled with a function name, library name, and/or library version. The function fingerprint 212 can be translated to a hash.

At 608, the function fingerprint 212 or function fingerprint with a label 242 can be utilized to compare to other fingerprint(s) to identify library names and/or versions to identify vulnerabilities 252 in a vulnerabilities database 250. Comparing, by the system, the fingerprint to identify function name/versions 608 can include comparing the function fingerprint 212 to those in a vulnerabilities database 250 by, for example, cosine similarity. Comparing, by the system, the fingerprint to identify function name/versions 608 can include receiving vulnerabilities 252 from the vulnerabilities database 250 that are similar to those of the function fingerprint 212.

Figure 7:
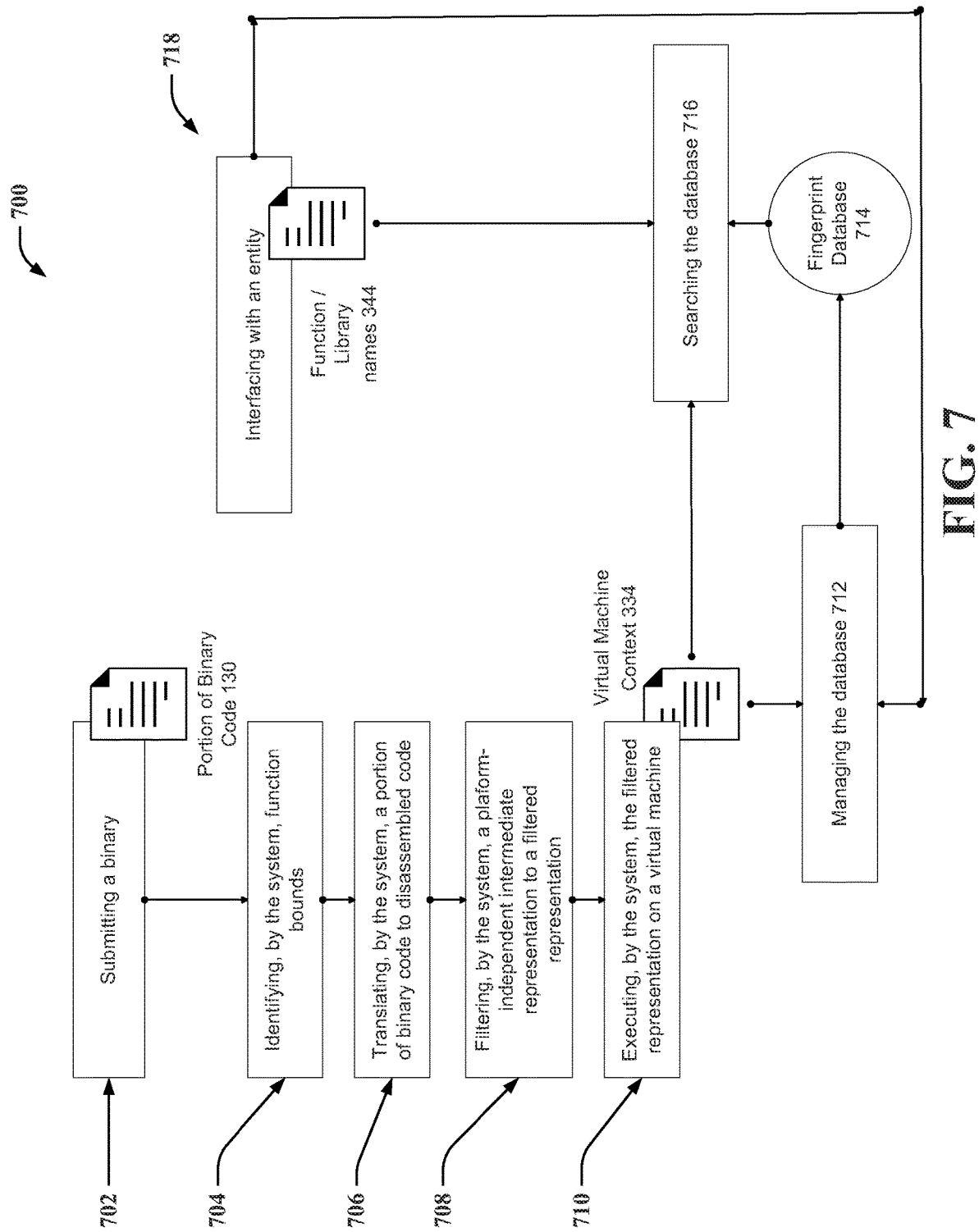
FIG. 7 illustrates a flow diagram of an example, non-limiting computer-implemented method that can build and/or use a database of machine code fingerprints in a portion of binary code in accordance with one or more embodiments described herein.

FIG. 7 illustrates a flow diagram 700 of an example, non-limiting computer-implemented method that can build and/or utilize a database of machine code fingerprints in a portion of binary code in accordance with one or more embodiments described herein. Repetitive description of like elements employed in other embodiments described herein is omitted for sake of brevity.

At 702, a portion of binary code 130 is submitted to the system by a submission component 316. Submitting a binary 702 can include a submission component 316 or an entity passing a portion of binary code 130 to a function identifier 216. The submission component 316 can be a component utilizing an algorithm for identifying suspicious code, a code package repository, public vulnerability database, source code repository, or a user interface that can receive binary code from an entity. The portion of binary code 130 can be a full application executable or library-specific shared object file(s).

At 704, the function bounds are identified. Identifying, by the system, function bounds 704 can identify function bounds within binaries that are statically linked, stripped, neither statically linked nor stripped, or both statically-linked and stripped, utilizing, for example, a function identifier 216. The function identifier 216 can receive the portion of binary code 130, determine the function bounds, and output at least one individual function 318. The at least one individual function 318 can be in assembly language, as the function identifier 216 can utilize a disassembler component 152 to provide a higher-level representation. The function identifier 216 can utilize metadata from the portion of binary code 130. The function identifier 216 can determine function bounds in a stripped binary by isolating basic blocks of binary code, eliminating function calls between nodes, and following the control flow (ignoring direction) between the basic blocks.

At 706, the assembly language representation of at least one individual function 318 is translated into a platform independent intermediate representation 324. Translating, by the system, a portion of binary code to disassembled code can include a translation component 322 translating the individual function 318 into a platform-independent intermediate representation 324. The translation component 322 passes the platform-independent intermediate representation 324 to at least one filter component 326. The platform-independent intermediate representation can be, without limitation, a meta-assembly language.

At 708, the platform-independent intermediate representation 324 is filtered to a filtered representation 328. Filtering, by the system, a platform-independent intermediate representation to a filtered representation 708 can include a filter component 326 producing a filtered representation 328. The filter component 326 can produce a filtered representation 328 by removing at least one complex instruction from the platform-independent intermediate representation 324 and sorting the platform-independent intermediate representation, which can be based on the removal of the at least one complex instruction. The filter component 326 can deterministically sort the remaining instructions with only loose adherence to the intended effect of the function and produce a filtered representation 328. The at least one complex instruction can be instructions related to control flow, addressing modes, and/or floating point operations.

At 710, the filtered representation 328 is approximately executed. Executing, by the system, the filtered representation on a virtual machine 708 can include a filter component 326 passing the filtered representation 328 to an approximate concrete execution component 230. The approximate concrete execution component 230 can include a virtual machine 166 that is pre-populated with a pre-determined, consistent set of initial register values and memory values. The approximate concrete execution component 230 can loosely execute the filtered representation 328 on the virtual machine to produce a virtual machine context 334. The virtual machine context 334 can include the final register values and memory values of the virtual machine 166. The approximate concrete execution component 230 can execute the filtered representation 328 on the virtual machine 166. The final register values and memory values of the virtual machine 166 based on approximate concrete execution of the filtered representation 328 can be a virtual machine context 334, which can be translated to a hash. The approximate concrete execution component 230 can pass the virtual machine context to a database management component 336 and/or a search component 338.

At 712, the database is managed. Managing the database 712 can include a database management component 336 receiving the virtual machine context 334 and associated function/library names from a user interface 340 and populating a fingerprint database 342 with a combined virtual machine context 334 and function/library name 344. The function/library name 344 can be received from a user interface by interfacing with the entity 718.

At 716, the database is searched. Searching the database 716 can include a search component 338 receiving a virtual machine context 334 from a database management component 336 and searching the fingerprint database 342 for cosine-similar vectors of register values and memory values. The search component 338 can pass the most cosine-similar vector(s) with their associated function/library names to a user interface 340 by interfacing 718 with the entity. The search component 338 can also receive function/library names 344 from a user interface 340 by interfacing with the entity 718 and search the fingerprint database 342 for vulnerabilities.

Moreover, because disassembly, translation, execution, filtering, populating, etc. and/or communication between processing components and/or an assignment component is established from a combination of electrical and mechanical components and circuitry, a human is unable to replicate or perform the subject disassembly, translation, execution, filtering, etc. and/or the subject communication between processing components and/or a database component. For example, a human is unable to filter a platform-independent intermediate representation for execution on a virtual machine, execute a platform-independent intermediate representation on a virtual machine, etc. Moreover, a human is unable to generate an output vector of register values and memory values based on execution in a virtual machine with consistent initial register values and memory values, etc.

Figure 8:
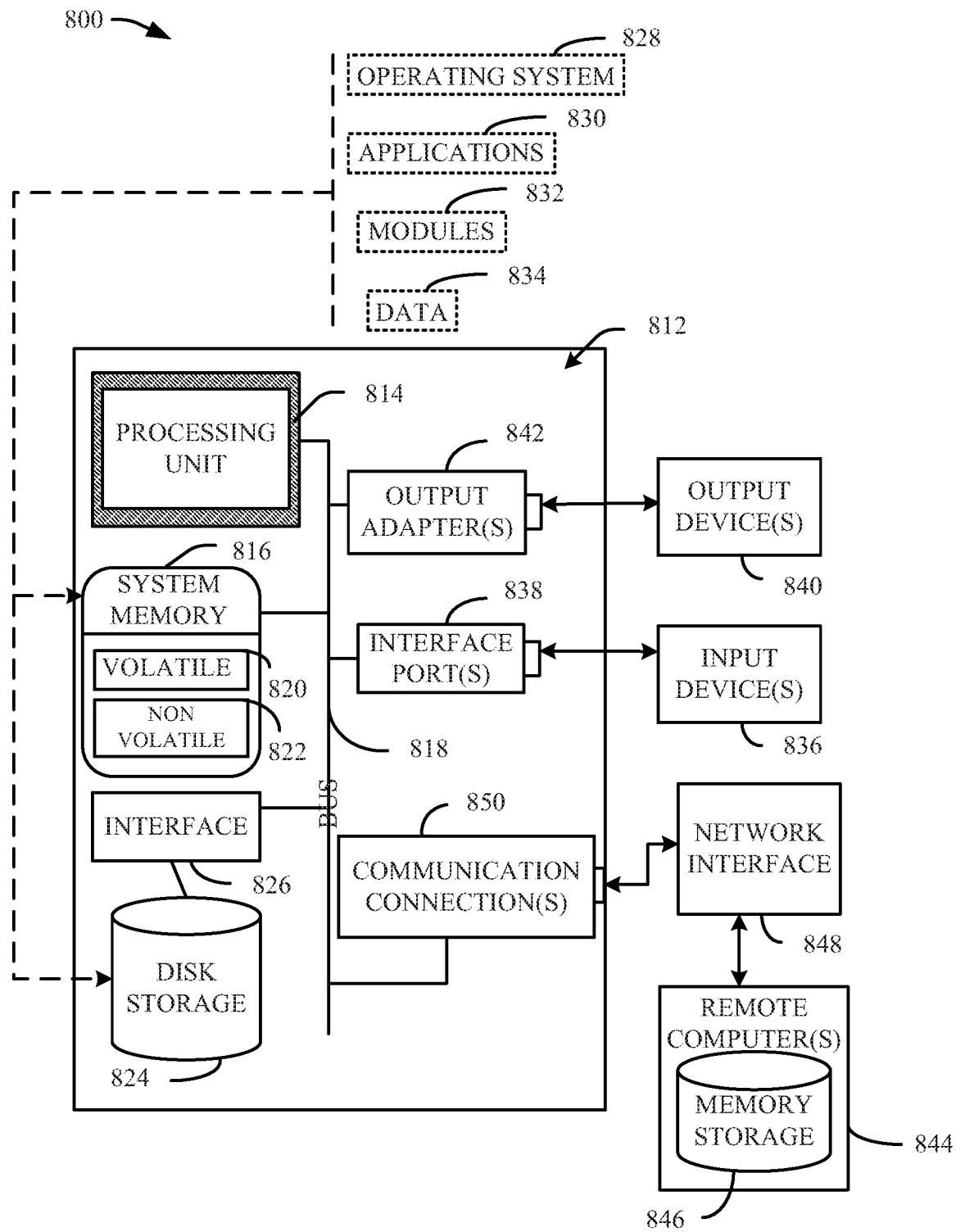
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 820 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
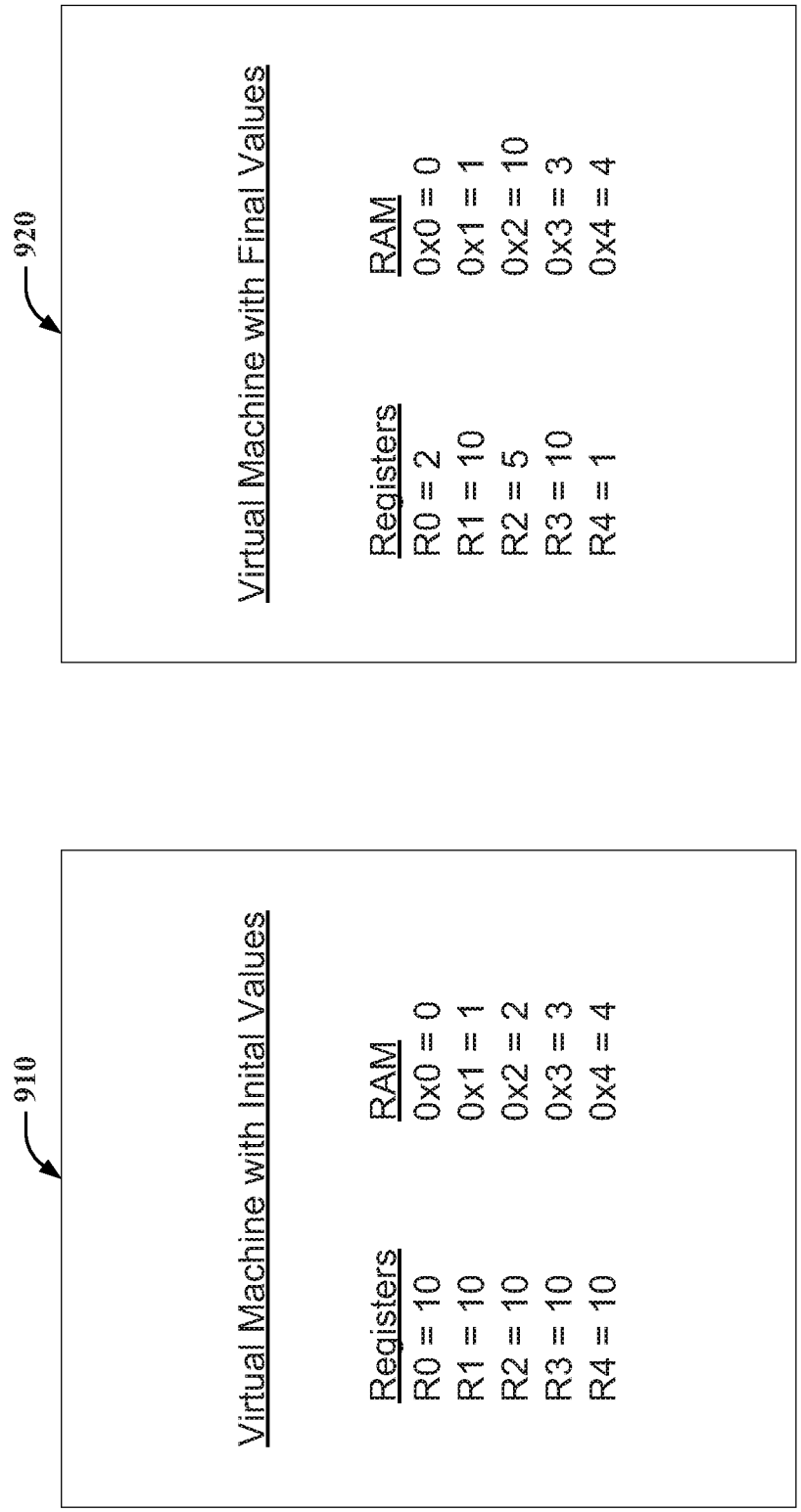
FIG. 9 illustrates example, non-limiting virtual machine register values and memory values in an initial state and based on approximate concrete execution in accordance with one or more embodiments described herein.

FIG. 9 illustrates example, non-limiting virtual machine register values and memory values 910, 920 in an initial state and based on approximate concrete execution in accordance with one or more embodiments described herein. Repetitive description of like elements employed in other embodiments described herein is omitted for sake of brevity.

A virtual machine initializer can pre-populate a virtual machine with a pre-determined, consistent set of register values and memory values. These initial state register values and memory values 910 can be arbitrary but can be consistent values 910 chosen for the register and memory portions of the virtual machine. Based on approximate concrete execution of the filtered representation, the virtual machine will have another set of register values and memory values 920. The register values and memory values 920 based on approximate concrete execution can be output as a function fingerprint.

An output function fingerprint can be the register values and memory values 920 based on approximate concrete execution, as shown at 920: 2, 10, 5, 10, 1, 0, 1, 10, 3, 4, which represent the values at R1, R2, R3, R4, R5, 0x0, 0x1, 0x2, 0x3, and 0x4 at 920, respectively. An output function fingerprint can be the difference between the initial register values and memory values 910 and the based on approximate concrete execution register values and memory values 920: 8, 0, 5, 0, 9, 0, 0, −8, 0, 0, which represent the difference of values at R1, R2, R3, R4, R5, 0x0, 0x1, 0x2, 0x3, and 0x4 between 910 and 920, respectively. If the virtual machine is populated with a consistent set of initial register values and memory values 910, these can be mathematically equivalent. In some embodiments, a consistent set of initial register values and memory values 910 can be a set of register values and memory values 910 that remains the same for each initial pre-population of the virtual machine 166.

Figure 10:
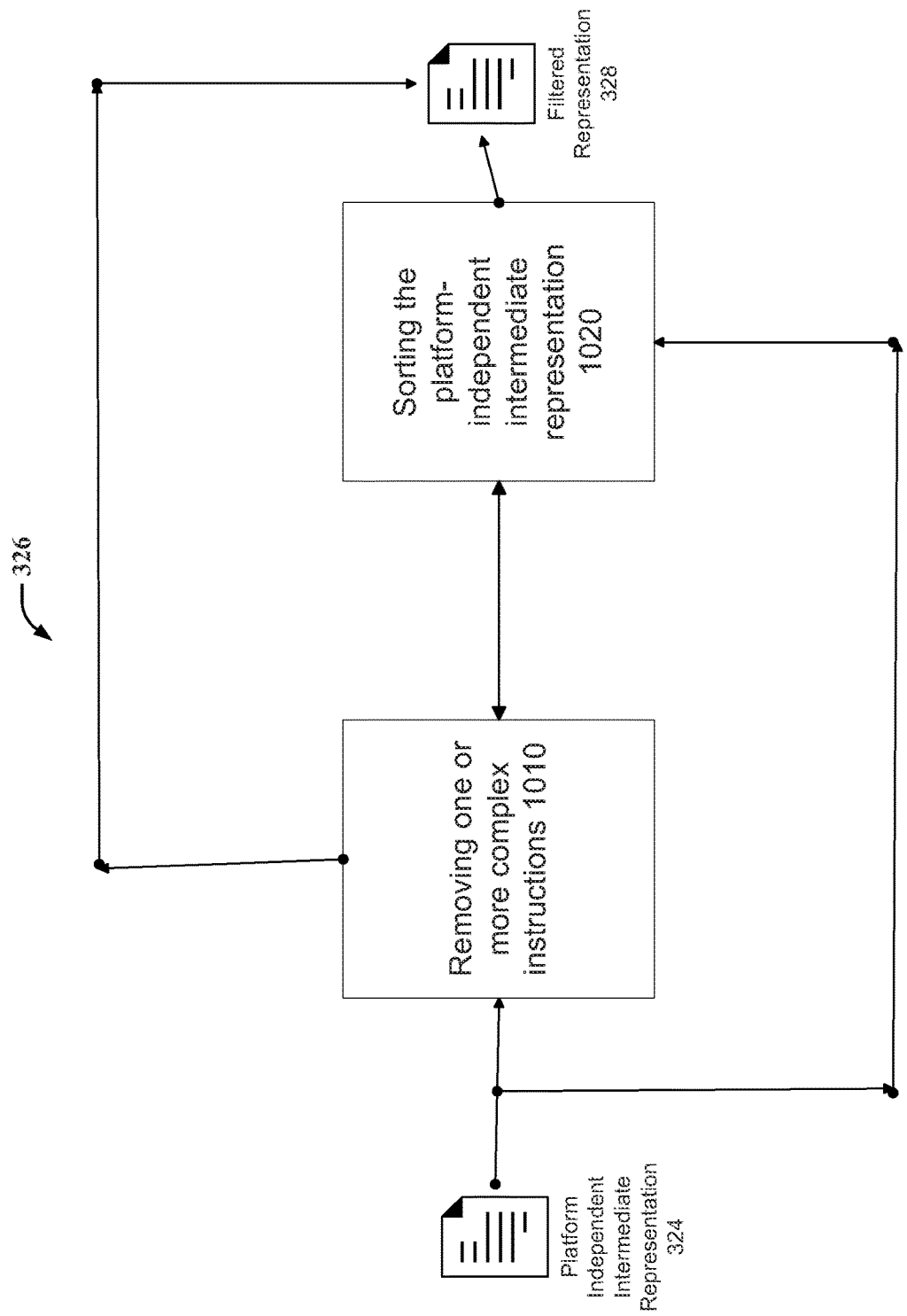
FIG. 10 illustrates a block diagram of an example, non-limiting filter component in accordance with one or more embodiments described herein.

FIG. 10 illustrates a block diagram of an example, non-limiting filter component 326 in accordance with one or more embodiments described herein. Repetitive description of like elements employed in other embodiments described herein is omitted for sake of brevity.

The filter component 326 can produce a filtered representation 328 by removing one or more complex instruction 1010 from the platform-independent intermediate representation 324 and sorting 1020 the platform-independent intermediate representation 324. The removing one or more complex instructions 1010 of the filter component 326 can comprise receiving a platform-independent intermediate representation 324 and removing at least one complex instruction. The one or more complex instructions can be any instruction or instructions related to control flow, addressing modes, or floating-point operations of the platform-independent intermediate representation. As used herein, instructions relating to control flow can be instructions relating to the sequence in which function calls, instructions, and/or statements are executed. The output of the removing one or more complex instructions 1010 can be a filtered representation 328. In some embodiments, the output of the removing one or more complex instructions 1010 can proceed to sorting the platform-independent intermediate representation 1020.

Sorting the platform-independent intermediate representation 1020 can receive the platform-independent intermediate representation 324 or the output based on removing one or more complex instructions. Sorting the platform-independent intermediate representation 1020 can include sorting the platform-independent intermediate representation to make the platform-independent intermediate representation 324 compiler independent. To make the platform-independent intermediate representation 324 compiler independent, sorting the platform independent intermediate representation 1020 can deterministically sort the instructions. In some embodiments, this deterministic sorting can include sorting loose adherence to the intended effect of the instructions and/or an approximate but more efficient instruction set. Sorting the platform-independent intermediate representation 1020 can include sorting the platform independent intermediate representation 324 to account for differences in compilers that produced the portion of binary code on which the platform-independent intermediate representation 324 can be based. Differences in compilers can result from decisions in compiler design including, for example, decisions on peephole optimization, loop optimization, and local optimization, which can produce different binary code for the same set of source code. The output of sorting the platform-independent intermediate representation 1020 can be a filtered representation 328. In some embodiments, the output of the sorting the platform independent intermediate representation 1020 can be passed to removing one or more complex instructions 1010, whose output will be the filtered representation 328.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 816 and FIG. 8. Such examples of memory 165 can be employed to implement any embodiments of the subject disclosure.

According to multiple embodiments, processor 160 can comprise one or more types of processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more central processing unit, multi-core processor, microprocessor, dual microprocessors, microcontroller, System on a Chip (SOC), array processor, vector processor, and/or another type of processor. Further examples of processor 160 are described below with reference to processing unit 814 and FIG. 8. Such examples of processor 160 can be employed to implement any embodiments of the subject disclosure.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components, and
   a processor that executes the computer executable components stored in the memory, wherein the computer executable components comprise:
     a filter component that filters a platform-independent intermediate representation of a portion of binary code into a filtered representation; and
     an execution component that:
       executes the filtered representation on a virtual machine to create an output vector, wherein the output vector comprises final register values and memory values of the virtual machine resulting from the execution of the filtered representation, and
       determines whether the portion of binary code comprises a code vulnerability based on comparing the output vector with fingerprints of vulnerabilities in a vulnerabilities database.

2. The system of claim 1, further comprising:
   a disassembler component that disassembles the portion of binary code to disassembled code, wherein the portion of binary code is a function from one or more stripped binaries comprising one or more bounds provided by a function identifier.

3. The system of claim 2, further comprising:
a translator component that translates the disassembled code to the platform-independent intermediate representation, wherein the platform-independent intermediate representation is in a meta-assembly language.

4. The system of claim 1, further comprising:
a population component that populates a database with the output vector.

5. The system of claim 1, wherein the filter component removes one or more complex instructions from the platform-independent intermediate representation and sorts the platform-independent intermediate representation to make the platform-independent intermediate representation compiler independent, wherein the one or more complex instructions comprise instructions selected from a group consisting of control flow, addressing modes, or floating-point operations of the platform-independent intermediate representation.

6. The system of claim 1, further comprising:
a virtual machine initializer component that initializes the virtual machine with a pattern of register values and memory values.

7. The system of claim 1, wherein the execution of the filtered representation is by approximate concrete execution.

8. A computer-implemented method, comprising:
filtering, by a system operatively coupled to a processor, a platform-independent intermediate representation of a portion of binary code into a filtered representation;
executing, by the system, the filtered representation on a virtual machine to create an output vector, wherein the output vector comprises final register values and memory values of the virtual machine resulting from the execution of the filtered representation; and
determining, by the system, whether the portion of binary code comprises a code vulnerability based on comparing the output vector with fingerprints of vulnerabilities in a vulnerabilities database.

9. The computer-implemented method of claim 8, further comprising:
disassembling, by the system, the portion of binary code to disassembled code, wherein the portion of binary code is a function from one or more stripped binaries comprising one or more bounds provided by a function identifier.

10. The computer-implemented method of claim 9, further comprising:
translating, by the system, the disassembled code to the platform-independent intermediate representation, wherein the platform-independent intermediate representation is in a meta-assembly language.

11. The computer-implemented method of claim 8, further comprising:
populating, by the system, a database with the output vector.

12. The computer-implemented method of claim 8, wherein the filtering comprises:
removing one or more complex instructions from the platform-independent intermediate representation; and
sorting the platform-independent intermediate representation to make the platform-independent intermediate representation compiler independent.

13. The computer-implemented method of claim 12, wherein the one or more complex instructions comprise instructions selected from a group consisting of control flow, addressing modes, and floating-point operations of the platform-independent intermediate representation.

14. The computer-implemented method of claim 8, further comprising:
initializing, by the system, the virtual machine a defined pattern of register values and memory values.

15. The computer-implemented method of claim 8, wherein the execution of the filtered representation is by approximate concrete execution.

16. A computer program product for identifying code vulnerabilities, the computer program product comprising a computer readable storage medium having program instructions embodied therewith, the program instructions executable by a processor to cause the processor to:
filter, by the processor, a platform-independent intermediate representation of a portion of binary code into a filtered representation; and
execute, by the processor, the filtered representation on a virtual machine to create an output vector, wherein the output vector comprises final register values and memory values of the virtual machine resulting from the execution of the filtered representation; and
determine, by the processor, whether the portion of binary code comprises a code vulnerability based on comparing the output vector with fingerprints of vulnerabilities in a vulnerabilities database.

17. The computer program product of claim 16, wherein the program instructions executable by the processor further cause the processor to disassemble, by the processor, the portion of binary code to disassembled code, wherein the portion of binary code is a function, wherein the function is from one or more stripped binaries comprising one or more bounds provided by a function identifier.

18. The computer program product of claim 17, wherein the program instructions executable by the processor further cause the processor to translate, by the processor, the disassembled code to the platform-independent intermediate representation, wherein the platform-independent intermediate representation is in a meta-assembly language.

19. The computer program product of claim 16, wherein the program instructions executable by the processor to further cause the processor to populate, by the processor, a database with the output vector.

20. The computer program product of claim 16, wherein the program instructions executable by the processor to further cause the processor to initialize, by the processor, the virtual machine; and
wherein the platform-independent intermediate representation is filtered to the filtered representation by removing one or more complex instructions and sorting the platform-independent intermediate representation wherein the one or more complex instructions are removed to make the platform-independent intermediate representation compiler independent, wherein the one or more complex instructions comprise instructions selected from a group consisting of control flow, addressing modes, or floating-point operations of the platform-independent intermediate representation, and wherein the virtual machine is initialized with a known pattern of register values and memory values.

* * * * *